(12) United States Patent
Patton et al.

(10) Patent No.: US 6,842,533 B1
(45) Date of Patent: Jan. 11, 2005

(54) PRINTING VERIFIED PRE-APPROVED IMAGES

(75) Inventors: David L. Patton, Webster, NY (US); Gustavo R. Paz-Pujalt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/523,859

(22) Filed: Mar. 13, 2000

Related U.S. Application Data (63) Continuation-in-part of application No. 09/473,938, filed on Dec. 8, 1999.

(51) Int. Cl.[7] .............................. G06K 9/00; A63F 9/24
(52) U.S. Cl. ......................... 382/115; 382/100; 463/29
(58) Field of Search ........................... 463/29; 340/5.27, 340/5.1, 5.2; 705/40; 101/93.07; 382/115, 100

(56) References Cited

U.S. PATENT DOCUMENTS

| | | | | |
|---|---|---|---|---|
| 3,893,389 A | * | 7/1975 | Kodis ....................... | 101/93.07 |
| 4,774,571 A | * | 9/1988 | Mehdipour et al. ......... | 348/148 |
| 5,608,387 A | * | 3/1997 | Davies ...................... | 340/5.27 |
| 5,838,814 A | * | 11/1998 | Moore ........................ | 382/115 |
| 5,920,053 A | * | 7/1999 | DeBrouse .................... | 235/375 |
| 5,923,406 A | * | 7/1999 | Brasington et al. .......... | 355/40 |
| 5,954,583 A | * | 9/1999 | Green .......................... | 463/29 |
| 5,973,731 A | * | 10/1999 | Schwab ....................... | 348/161 |
| 5,974,401 A | * | 10/1999 | Enomoto et al. ............. | 705/40 |

FOREIGN PATENT DOCUMENTS

| WO | WO 99/67720 | 12/1999 | ........... G06F/15/30 |
|---|---|---|---|

* cited by examiner

*Primary Examiner*—Leo Boudreau
*Assistant Examiner*—Tom Y. Lu
(74) *Attorney, Agent, or Firm*—Raymond L. Owens (57) ABSTRACT

A method for accessing a pre-approved image associated with a user which is stored in a first memory by an authorizing agency and is assigned a particular identification code which is linked to the pre-approved image and for making a document having such pre-approved image, including the steps of the user transferring his or her identification code for the pre-approved image to a receiving agency; the receiving agency accessing the stored pre-approved image using the transferred identification code and transferring such pre-approved image to a second memory; the receiving agency viewing the pre-approved image from the second memory so the receiving agency can verify that the viewed image is authentic; and printing the pre-approved authenticated image, text or graphics from the second memory at the receiving agency as part of a document.

11 Claims, 8 Drawing Sheets

PRINTING VERIFIED PRE-APPROVED IMAGES

CROSS REFERENCE TO RELATED APPLICATION

This application is a continuation-in-part of U.S. patent application Ser. No. 09/473,938 filed Dec. 28, 1999 by David L. Patton et al, entitled "Verifying the Authenticity of a User Using Pre-Approved Images", the disclosure of which is incorporated herein.

FIELD OF THE INVENTION

This invention relates to verifying the authenticity of a user using pre-pre-approved images.

BACKGROUND OF THE INVENTION

Digital technologies enable a user to digitize a personal image such as a hardcopy print or photographic negative by scanning the print or photographic negative to obtain image data which is stored as an image file on the user's personal computer. The image file can be displayed on the user's personal computer enabling the user to manipulate selected images using software such as Adobe PhotoShop. The user can transmit the image file over a channel such as the Internet or send via the U.S. Postal Service a hard copy of the image such as a print to a receiving agency for printing, reprinting and ordering related image services. Services selected using the chosen images are used in a number of different applications. In one of those applications, so-called "sticker prints" are made on a print media having an adhesive base and arranged so that they can be peeled off and individually pasted onto another surface. However, these stickers are not used in situations, which require that they be "authentic" such as postage stamps. By use of the term "authentic" is meant that the image can indicate to a viewer or a reader with a high degree of certainty that the image has not been counterfeited.

One of the image related services might be the request for personalized postage stamps. Personalized postage stamps is where stamps are produced on demand with customer specified subject matter. Currently one of the requirements of postal authorities is that the image contents of a postal stamp be regulated with respect to quality, authenticity of the stamp and other characteristics such as the nature of the subject matter. By subject matter it is meant any depiction or otherwise representation portrayed in printed or encoded form on the stamp. There are specific guidelines and safeguards to protect the public and individuals with respect to decency, objectionable images and or text, and the right to use a specific image or representation in the form of postal stamps. Commonly-assigned U.S. patent application Ser. No. 09/359,152, filed Jul. 22, 1999, entitled "Authorizing the Printing of Digital Images" by Patton et al describes a method for sending a digital image file to an authorizing agency. The authorizing agency receiving the digital image file displays at least one received digital image and examines the displayed digital image to determine whether its contents are acceptable for making images. After examining the displayed image and verifying the user's authorization information, the authorizing agency approves the printing of the transmitted digital image on a receiver such as a stamp at a designated location.

Commonly-assigned U.S. patent application Ser. No. 09/378,159, filed Aug. 19, 1999, entitled "System for Customizing and Ordering Personalized Postage Stamps," by Patton et al describes a system and method for customizing and ordering an official postal product. The system includes a central authorizing computer system for communicating with at least one remote ordering system over a communication network. The central authorizing computer system having a computer program for forwarding information to the at least one remote ordering system for allowing customizing of an image for use in an official postal product from the at least one remote ordering system.

One problem with the methods disclosed above is there are no provisions for permanently storing an image and its authorization so the image can be printed again at a later time on a receiver such as a stamp without having to be pre-approved.

A second problem is that in addition to the image there can be associated text and graphics that has been previously pre-approved and would need to be pre-approved to be printed again on a receiver such as a stamp.

A third problem is the user would have to resubmit the image, text, and graphic to the authoring agency along with their permission to print the image, text and graphics on a receiver such as a stamp.

A fourth problem is after an image, text or graphic has been submitted and pre-approved there is no way to identify and track the image, text or graphic for later retrieval and use.

A fifth problem is after an image, text or graphic has been submitted and verified there is no way to incorporate the retrieved image, text or graphics into an existing document that is printed at the requesting site.

SUMMARY OF THE INVENTION

An object of the present invention is to provide a method in which pre-approved images are use to verify the authenticity of the user eliminating the problems discussed above.

This object is achieved by a method for accessing a pre-approved image associated with a user which is stored in a first memory by an authorizing agency and is assigned a particular identification code which is linked to the pre-approved image and for making a document having such pre-approved image, comprising the steps of:

(a) the user transferring his or her identification code for the pre-approved image to a receiving agency;

(b) the receiving agency accessing the stored pre-approved image using the transferred identification code and transferring such pre-approved image to a second memory;

(c) the receiving agency viewing the pre-approved image from the second memory so the receiving agency can verify that the viewed image is authentic; and (d) printing the pre-approved authenticated image, text or graphics from the second memory at the receiving agency as part of a document.

A feature of the invention is that text and graphics can be associate with the pre-approved image in the first memory. This feature makes the present invention particularly suitable for making postage stamps. It also has a wide range of applications where it is needed to verify the identity of the user. For example it could be used for college board registration, ticketing, voter registration, credit card verification etc.

Another feature of the present invention is to print the person's image as an intregral part of the document at the second memory location creating a document such as a ticket, money order, gift certificate, test application, voter registration card, identification card, prescription label or document containing the person authenticated image. Printing the authenticated image of the person who purchased or is going to use the ticket, money order, gift certificate, test application, voter registration card, identification card, prescription label or document provides a method for the issuer or seller of the ticket etc to verify that the right person receives and uses the ticket etc.

An additional feature of the present invention is to provide the person buying or using the document such as a ticket, a way to verify to the issuer or seller that they are the person who bought the document or are the person who should be using the document.

DETAILED DESCRIPTION OF THE PREFERRED EMBODIMENTS

Figure 1:
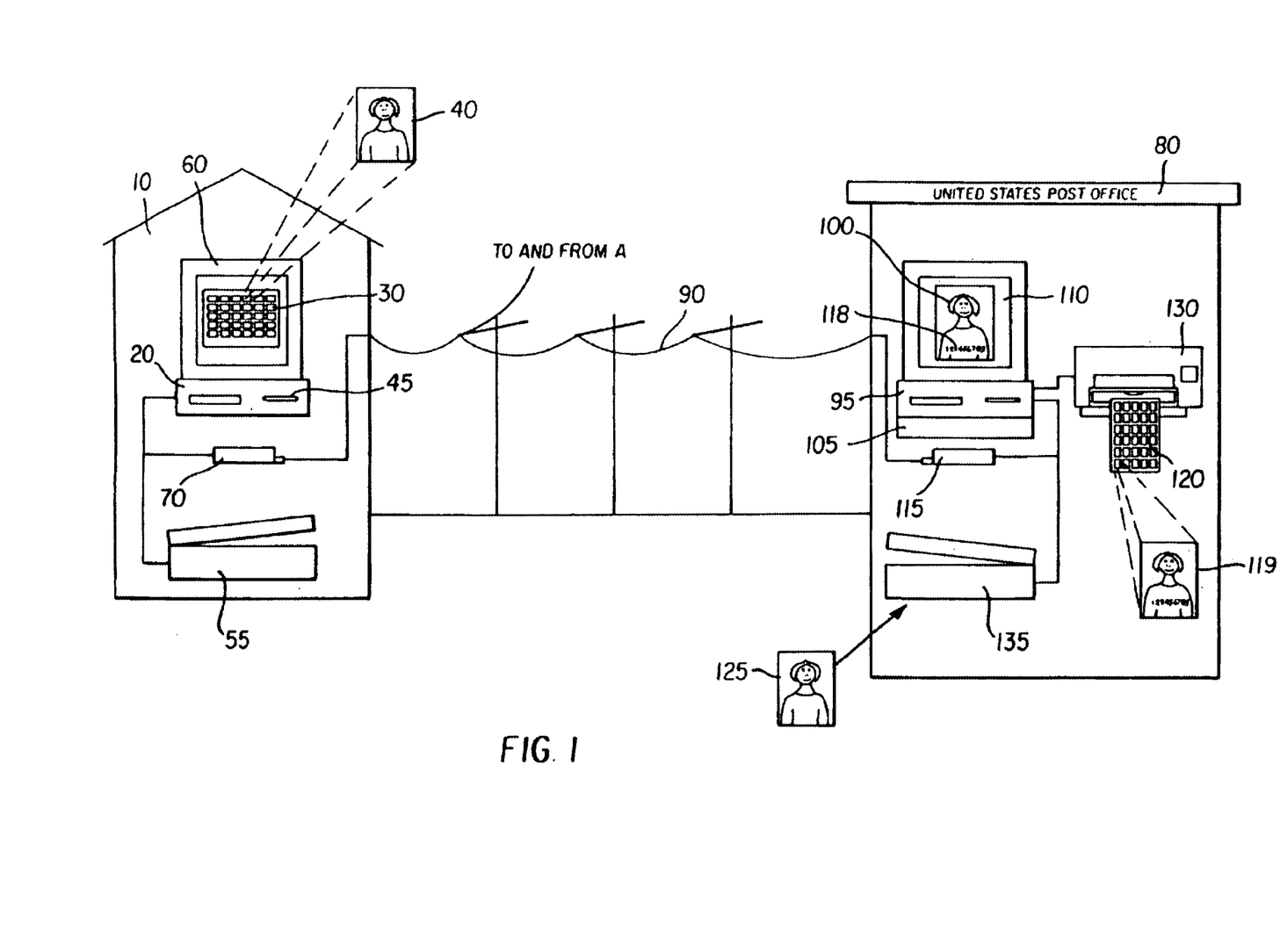
FIG. 1 is a block diagram of a system for remotely selecting images and transmitting a digital file of the selected image to an authorizing agency such as a post office.

Referring now to FIG. 1, there is illustrated a system for remotely selecting an image and transmitting the selected image to an authorizing agency along with authorizing information for authorizing, encoding and storage in a first memory location for later retrieval and use. The user submitting the selected image can later request the pre-approved image is used to produce stamps or other document requiring a pre-approved image. In addition the user can request the pre-approved image be transmitted to a second memory location (See FIG. 3) to verify the identity of the user requesting a service. A user on a personal computer 20 or interactive TV views a set of personal images 30 at a remote memory location 10. The viewing can be done on the user's own personal computer, at a kiosk or other device at the remote memory location 10. The remote memory location 10 for example can be the user's home, a cyber cafe or place that has the ability to access images and transmit the images to the authorizing agency. The source of the set 30 of the personal images can be image files stored in digital format on floppy and hard disks, Picture CDs, Photo CDs, and CD-ROMs. The image files can be down loaded from the Internet using a system such as Kodak's PhotoNet, or negatives and prints can be scanned using a film scanner 45 or print scanner 55 and displayed on a personal computer's display 60. The desired image 40 is then selected and authorizing information is provided on the authorization form 230 (See FIG. 5). The authorizing information includes but not limited to the user's address, date of birth, motor vehicle license number, and credit card number. The user provides authorization that the image can be used at a later time to produce at the request of the user stamps or other documents requiring a pre-approved image. In addition the user authorizes that the image can be transmitted to a second memory location when requested to verify the identity of the user.

A digital file of the selected image 40 and the authorizing information are sent via a modem 70 to the authorizing agency 80 such as the U.S. Postal Service, an airline ticketing agent, college, drug store, etc over communication links 90 such as the Internet. The authorizing agency 80 receives the image file and authorizing information via a modem 115. The authorizing agency 80 verifies the received image file by viewing the received selected image 40 and the authorizing information on a monitor 110 and authorizes or approves the received selected image 40. The authorizing agency assigns an identification code 118, records the image file, identification code 118 and authorizing information using a computer 95, and stores the image file, identification code 118 and authorizing information as a pre-approved image 100 in a first memory location 105 such as on a server. The identification code 118 is used later for identification and retrieval of the image file of the pre-approved image 100 and authorization information from the first memory location 105.

In the case where the selected image 40 is an image of the user and the selected image 40 is to be used to verify the identity of the user, the appropriate steps need to be taken to guarantee the selected image 40 is an actual image of the user. The appropriate steps require the user provide proof of identity. Establishing proof of identity may require the user's have their picture taken at a specific location such as the Department of Motor Vehicle. Proof of identity may also be established by providing a previously issued passport, Certificate of Naturalization, driver's license, or a Government Issue Identity card or pass or having the user appear in person to register a previously taken picture. After the user has met the proof of identity requirements for the selected image 40, the selected image 40 is stored at the first memory location 105 as the pre-approved image 100 for use to verify the user's identity.

Figure 2A:
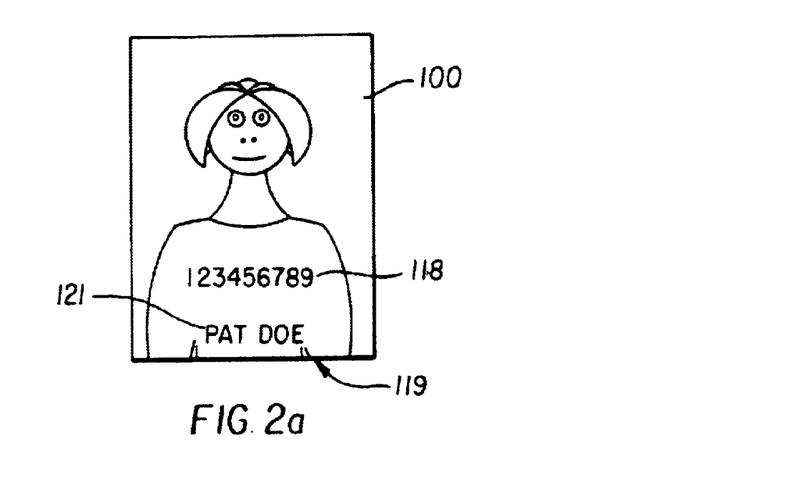
FIG. 2a is a hardcopy print of the pre-approved image with an assigned identification code.

Referring to FIG. 2a, a hardcopy print 119 of the pre-approved image 100 with identification code 118 is shown. The pre-approved image 100 is given a specific identification code 118 which can be printed onto the hardcopy print 119 in visible or invisible form along with the name 121 of the user. The identification code 118 can be in the form of a barcode, a numerical code with optical character recognition characteristics or a digital code embedded in the image itself. The identification code 118 and name 121 can be printed in visble form using fluorescent of phosphorescent dyes or other visble inks or dyes and non-visible form using infra red inks such as manufactured by the Eastman Chemical Company under the trade name N.I.R.F. (near-infrared fluorophore) inks.

When the pre-approved image 100 is requested for the purpose of verifying the identity of the user, the user's name 121 can be encoded and or printed on the hardcopy print 119. The user's name 121 can also be encoded as part of the image file transmitted from the first memory location 105 to a second memory location 140 at a receiving agency 136 (See FIG. 3). When the authorizing agency 80 is an airline ticketing agency, the authorizing agency 80 can add additional information to the digital file such as price, date, departure and arrival times, etc and transmit these to the second memory location 140 at the receiving agency 136.

Figure 2B:
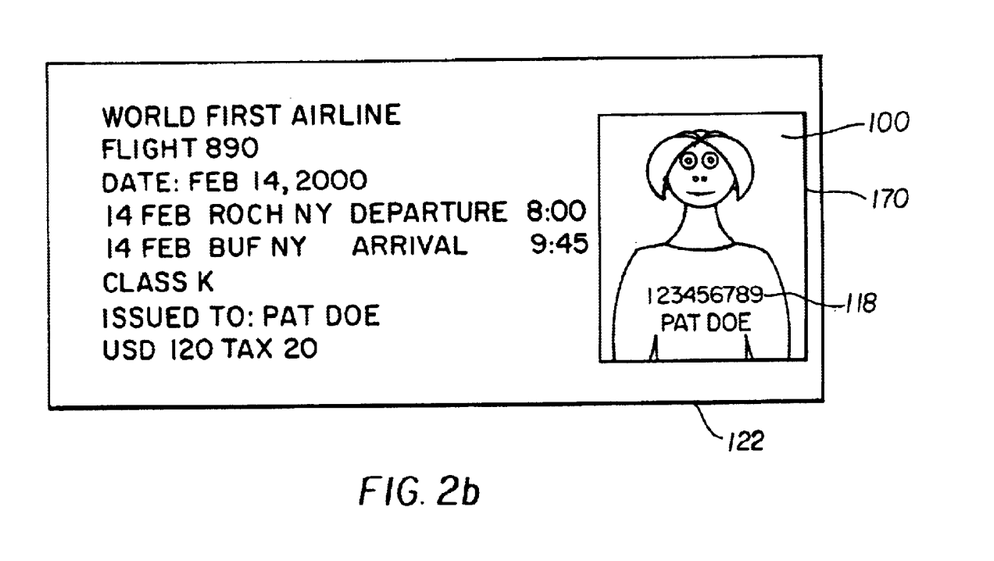
FIG. 2b is a hardcopy print of a document in the form of a ticket with the pre-approved image of the user with an assigned identification code.

Referring now to FIG. 2b when the receiving agency 136 (See FIG. 3) is printing certain documents, such as an electronically issued airline tickets, where the user or recipient is required to show proof of identity to pickup the ticket 122, a received digital image 170 of the pre-approved image 100 of the user is printed directly onto the ticket 122 eliminating the need for the user to provided other identification. The identification code 118 may or may not be printed as part of the ticket. The received digital image 170 of the user may be printed on a ticket 122 to a concert or sporting event ensuring that the person picking up the ticket 122 is the person who order and paid for the ticket 122. The received digital image 170 of the user may be printed on other official document such as a deed, title, student identification card, college board registration, or voter registration.

Referring back to FIG. 1, the user sends a hardcopy 125 of the image 40 and authorizing information to the authorizing agency 80 via a carrier such as the U.S. Postal Service, Federal Express, or DHL. The authorizing agency 80 receives the hardcopy image 125, scans the hard copy image 125 and the authorizing information using a scanner 135 such as an Epson ES-1200C, records the image file including authorizing information using a computer 95. The authorizing agency 80 assigns an identification code 118 and stores the digital file of the pre-approved image, authorization information and identification code 18 in a first memory location 105.

The user can request at a later date a number of personalized stamps 120 be produced using the pre-approved image 100. The personalized stamps 120 are produced using a thermal printer 130 such as a KODAK PS 8650 Color Printer or a KODAK Photo Printer 4700. Other types of digital printers such as a KODAK CRT Digital Color Printer, a Hewlett Packard Deskjet 870Cix Inkjet Printer, or a digital electrophotographic printer such as an Indigo—E—1000 can be used to produce the personalized stamps 120. Methods for producing authenticated images are disclosed in commonly assigned U.S. patent application Ser. No. 09/103,019, filed Jun. 23, 1998, entitled "Forming Authenticated Images In A Receiver" by Paz-Pujalt et, al. and U.S. patent application Ser. No. 09/165,066, filed Oct. 2, 1998, entitled "Receiver Having Authenticated Marks" by Paz-Pujalt et, al, the disclosures of which are incorporated herein by reference.

Figure 3:
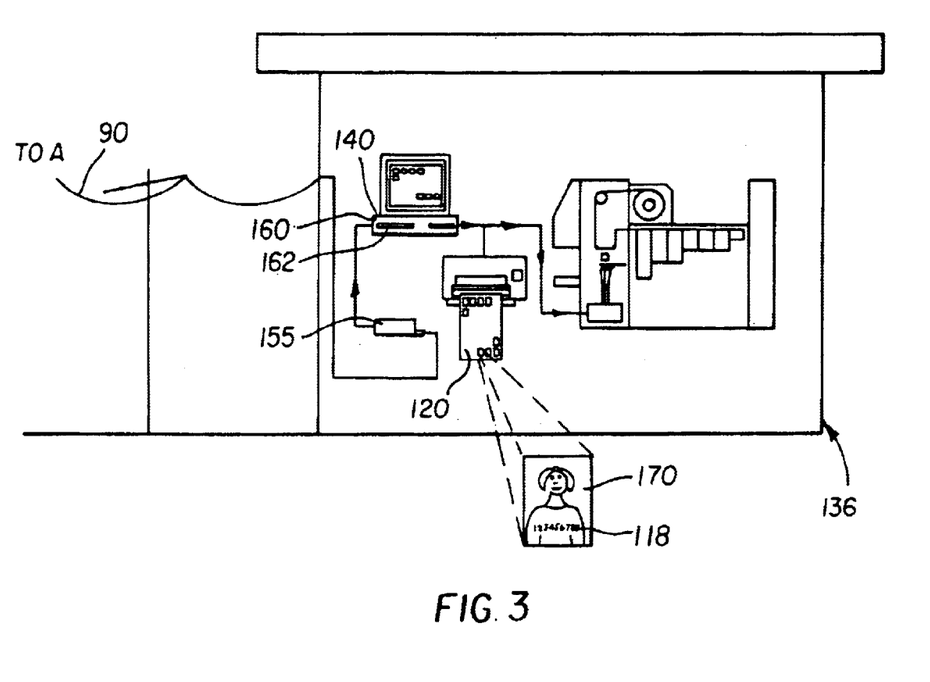
FIG. 3 is a block diagram of a system for requesting and receiving a pre-approved image at a memory location different than the authorizing agency for the production of such items as personalized postage stamps requiring authorization.

FIG. 3 is a block diagram of a system for requesting the pre-approved image from the first memory location 105 for use at the second memory location 140, which can be in a server or another computer 160 located at the receiving agency 136. The request can be for the pre-approved image 100 to be used for the production of items requiring authorization such as personalized postage stamps 120. The receiving agency 136, which can be a photofinisher includes the second memory location 140, or any place capable of receiving, storing on a mass storage unit 162 and printing the pre-approved received digital image 170. Using the identification code 118 (See FIG. 2a), the second memory location 140 of the receiving agency 136 requests a digital file of the pre-approved image 100 and authorizing information be sent via a modem 70 (See FIG. 1) to the second memory location 140 over communication links 90 such as the Internet. The second memory location 140 of the receiving agency 136 receives the image file and authorizing information via a modem 155 from the first memory location 105. The second memory location 140 of the receiving agency 136 records the image file and authorizing information using the computer 160, and stores the image file and authorizing information at the second memory location 140 of the receiving agency 136 on the mass storage unit 162.

Figure 4:
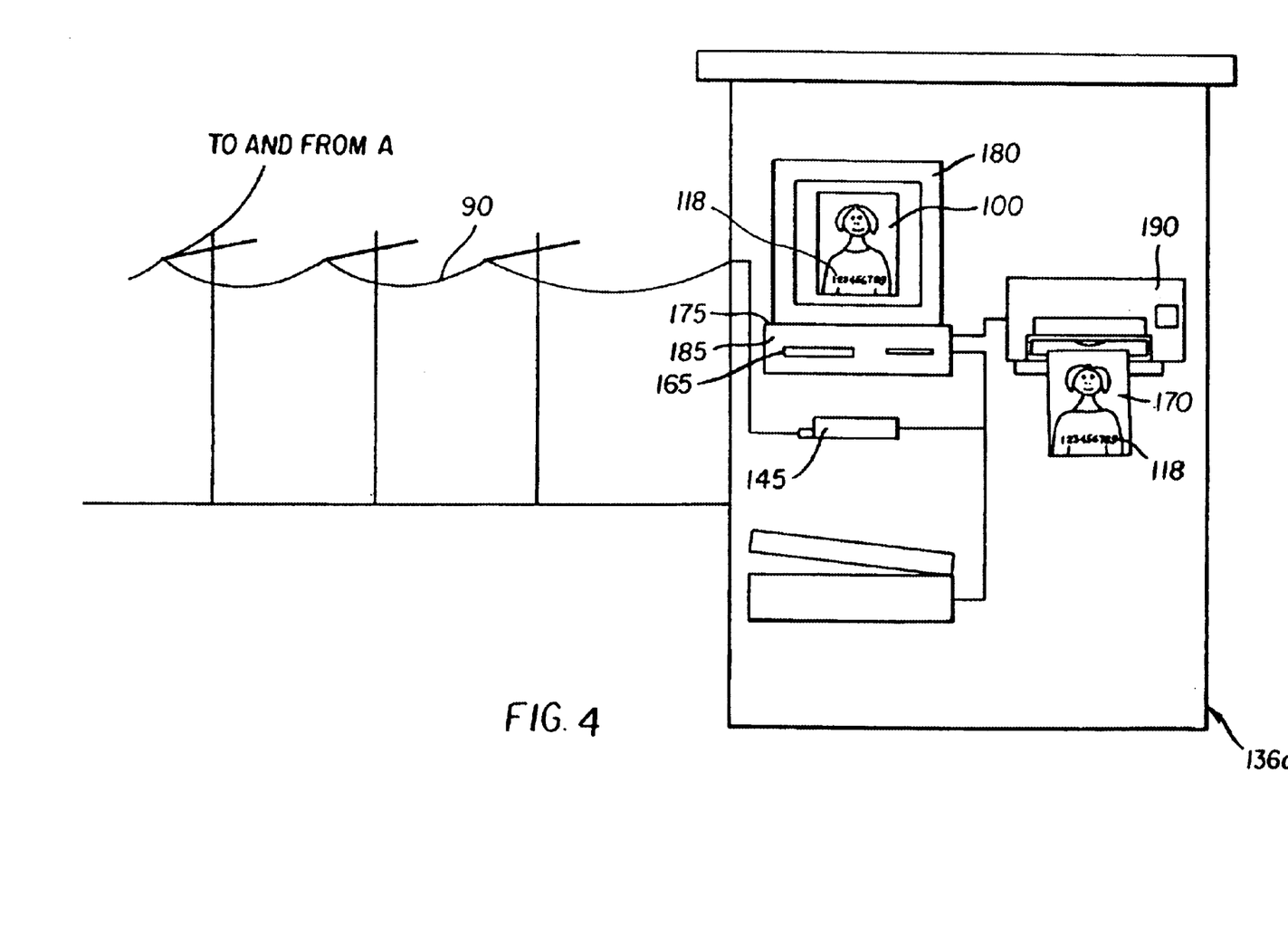
FIG. 4 is a block diagram of a system for requesting from the first memory location and receiving at a different memory location a pre-approved image for the purpose of verifying the identity of the user.

FIG. 4 is a block diagram of a system for requesting from the first memory location 105 and receiving a pre-approved image 100. FIG. 4 depicts a receiving agency 136a which is similar to the receiving agency 136 shown in FIG. 3. In FIG. 4 a remote memory location 175 is provided for the purpose of verifying the identity of the user. The remote memory location 175 at the receiving agency 136a can be provided in a server or another computer 185. Using the identification code 118, the remote memory location 175 requests a digital file of the pre-approved image 100 including the user's authorizing information be transmitted over communication links 90 such as the Internet to the remote memory location 175. The image file is received via a modem 145 at the remote memory location 175 and recorded using the computer 185. The identity of the user is verified by either viewing the pre-approved image 100 and authorizing information on a monitor 180 or printing a hardcopy of the received digital image 170 and authorizing information on a printer 190. The received image and authorizing information are can be stored for later reference using in a mass storage unit 165. For example, the receiving agency 136a can be a college which desires to verify a student's identity, or for voter registration or anyplace that requires an image of the user to verify the user's identify.

Figure 5:
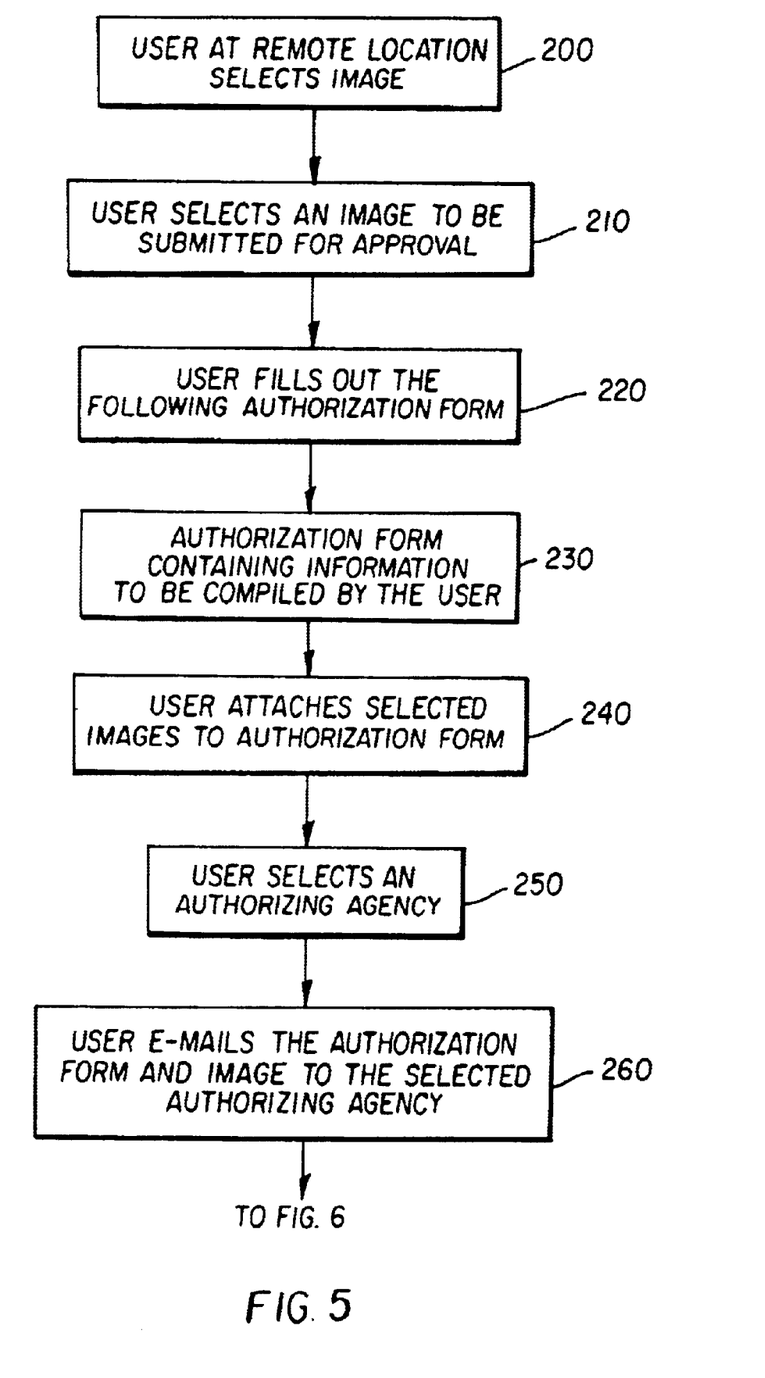
FIG. 5 is a flow chart showing how the user selects an image and sends a digital file of the selected image and authorizing information over the communication links to the authorizing agency.

Now referring to FIG. 5 there is provided a flow chart showing how the user selects an image at the remote location 10 and sends a digital file of the selected image 40 and authorizing information over the communication links 90 to the authorizing agency 80. The user selects the images 200 from the image files stored in the remote memory location's 175 memory to be displayed. The user as shown in block 210 selects from the display 60 the image 40 to be submitted for approval. The user then as shown in block 220 completes the authorizing form 230 providing the authorizing information. The authorizing form 230 contains the identification code 118. The user and the authorizing agency 80 can use the identification code 118 to insure the image 100 received by the authorizing agency 80 did come from and belong to the user requesting the selected image 40 be approved. The authorizing information includes but not limited to the user's address, date of birth, motor vehicle license number, and credit card number.

The user can request the authorizing agency 80 to link the user's pre-approved digital image 170 of the user to the user's credit card number. When the second memory location 140 requests payment from the authorizing agency 80, the second memory location 140 can request the user's pre-approved digital image 170 be sent to the second memory location 140 along with the authorization for payment. The second memory location 140 can then use the user's pre-approved digital image 170 to verify that the person using the credit card is the owner of the credit card.

The credit card includes a payment identifier which is usable to authorize payment from the user's account. It will be understood that the user can transfer the identification code 118 to an agent such as a friend or relative or business associate. After the authorizing agency 80 receives the payment identifier from the user or agent, the authorizing agency 80 receives payment from the user's account using such payment identifier. The user in addition to providing the identifiers of the image files, the user can also include text and graphics and respectively, which he or she wishes to have approved. In block 240, the user electronically attaches the image file of the selected image 40 to the authorizing form file. In block 250 the user selects an authorizing agency 80 and e-mails as shown in block 260 e-mails both files to the selected authorizing agency 80.

Figure 6:
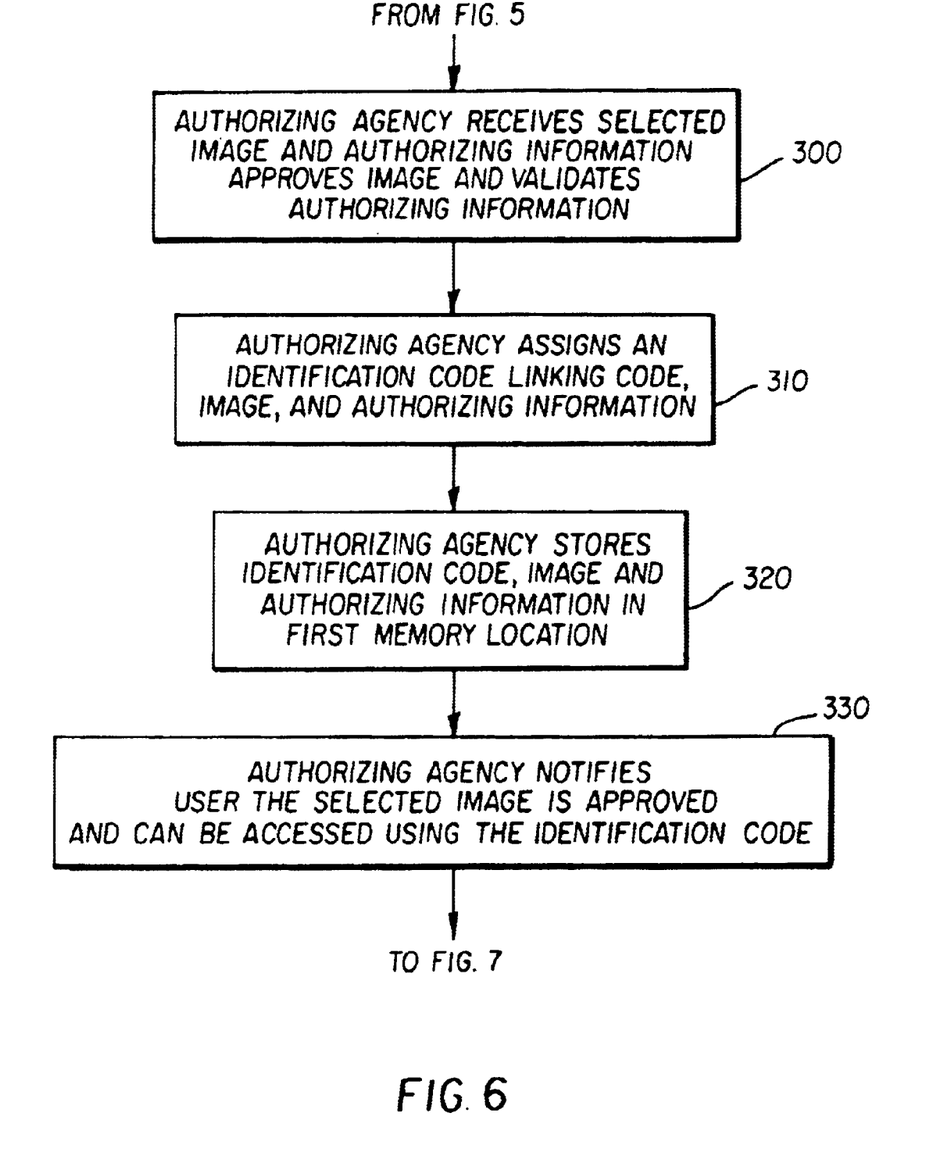
FIG. 6 is a flow chart continuing the flow chart of FIG. 5 and shows how selected images and authorizing information are received, approved, linked and stored by the authorizing agency.

Now referring FIG. 6, which continues the flow chart of FIG. 5 and shows how selected images and authorizing information are received, approved, linked and stored by the authorizing agency 80. The authorizing agency 80 receives in block 300 the image 100, text, graphics and authorizing information, approves the image 100, text, graphics and validates the authorizing information. The authorizing agency 80 assigns in block 310 the identification code 118, and in block 320 stores the image, text and graphics files, identification code 118 and authorizing information in the first memory location 105 linking the identification code 118, image 100, text, graphics and authorization information. In block 330, the authorizing agency 80 notifies the user or the user's agents and that the user's selected image 40 has been approved and can be accessed using the identification code 118.

Figure 7:
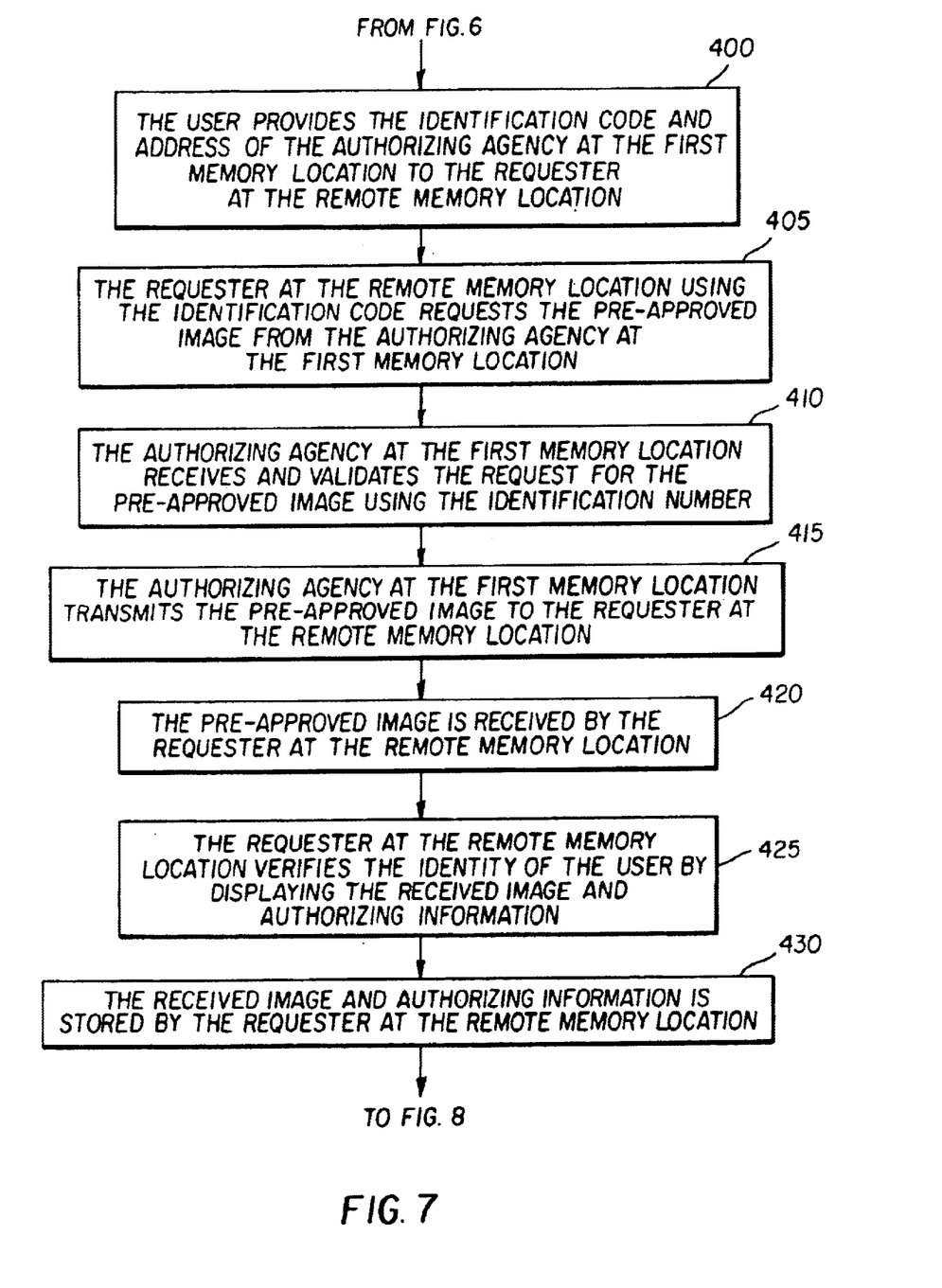
FIG. 7 is a flow chart continuing from the flow chart of FIG. 6 and shows how pre-approved images are used to verify the identity of the user at a remote location.

Now referring to FIG. 7, which continues the flow chart of FIG. 6, and shows how the pre-approved image 100 is used to verify the identity of the user at the remote memory location 175 of the receiving agency 136*a*. After selecting and submitting an image of himself or herself and receiving the identification code 118 from the authorizing agency 80 confirming the selected image 40 is approved as described in FIG. 5 and FIG. 6, the user can now use the pre-approved image 100 to verify their identity. As shown in block 400 when the user needs to verify his or her identity, the user provides to a requester at the remote memory location 175 of the receiving agency 136*a* the identification code 118 and the address of the authorizing agency 80 at the first memory location 105 where the pre-approved image 100 is stored. The address can be an e-mail or regular mail address. As shown block 405, using the identification code 118, the requester at the remote memory location 175 of the receiving agency 136*a* requests from the authorizing agency 80 at the first memory location 105 the digital file or hardcopy print 119 of the pre-approved image 100 including the user's authorizing information. In block 410, upon receiving and validating the request using the identification number 118. The authorizing agency 80 at the first memory location 105 transmits as shown in block 415 over communication links 90 such as the Internet the requested image 100 to the requester at remote memory location 175 of the receiving agency 136*a*. The authorizing agency 80 at the first memory location 105 can mail the hardcopy print 119 of the requested image 100 via the U.S. Postal Service or some other courier service such as Federal Express. The image 170 is received and recorded in block 420 by the requester at the remote memory location 175 of the receiving agency 136*a*.

As shown in block 425 the identity of the user is verified by displaying and viewing the received digital image 170 and authorizing information or creating a hardcopy 178 of the received digital image 170 and authorizing information. The received digital image 170 and authorizing information can be stored in block 430 by the requester at the remote memory location 175 of the receiving agency 136*a* for later reference.

Figure 8:
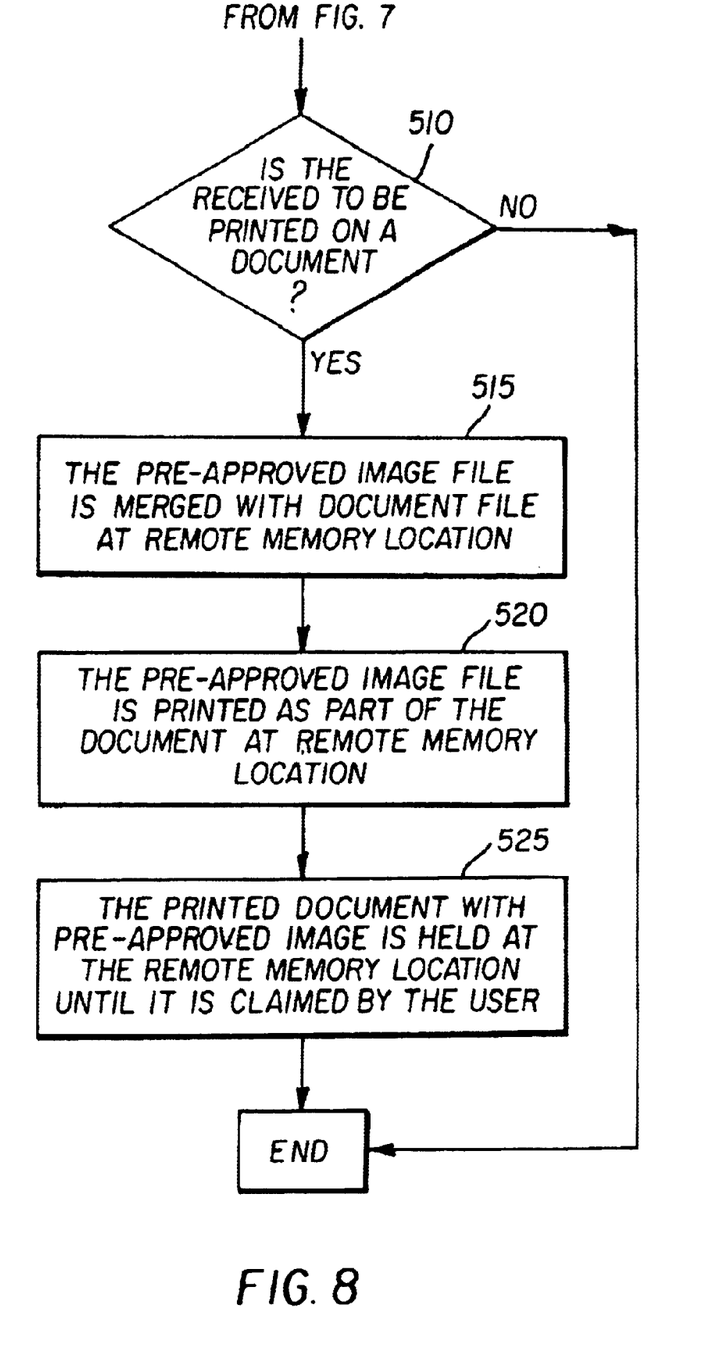
FIG. 8 is a flow chart continuing from the flow chart of FIG. 7 and shows how pre-approved images are printed on a document at a remote location.

Now referring to FIG. 8, which continues the flow chart of FIG. 7, and shows how the pre-approved digital image 170 is printed as part of a document at the remote memory location 175. As shown in decision block 510, the remote memory location 175 decides if the received digital image 170 is to be printed as part of the document such as the ticket 122 shown in FIG. 2*b*. If the received digital image 170 is printed as part of the document, the received image file is combined with the document file as shown in block 515. The document with the received digital image 170 is then printed at the remote memory location 175 as shown in block 520. The printed document with the pre-approved digital image 170 is held at the remote memory location 175 until it is claimed by the user or the user's authorized agent.

The invention has been described in detail with particular reference to certain preferred embodiments thereof, but it will be understood that variations and modifications can be effected within the spirit and scope of the invention.

Parts List

10 remote location
20 personal computer
30 personal images
40 selected image
45 film scanner
55 print scanner
60 display
70 modem
80 authorizing agency
90 communication link
95 computer
100 pre-approved image
105 first memory location
110 monitor
115 modem
118 identification code
119 hardcopy print
120 personalized stamps
121 user's name
122 ticket
125 hardcopy
130 printer
135 scanner
136 receiving agency
136*a* receiving agency
145 modem
140 second memory location Parts List Cont'd

155 modem
160 computer
162 mass storage unit
165 mass storage unit
170 digital image
175 remote memory location
180 monitor
185 computer
190 printer
200 select image to display
210 select image to submit
220 fills out authorizing form 230 authorizing form
240 attaches selected images
250 select authorizing agency
260 e-mail authorization form
300 receives image file and authorization form
310 assigns identification code
320 stores image file and authorization form
330 notifies user
400 provides identification code to user
405 request pre-approved image
410 receives and validates request
415 transmits pre-approved image
420 receives pre-approved image
425 verifies user's identity
430 stores pre-approved image and authorization form
510 decision block Parts List Cont'd 515 merge image file with document file
520 print document with received digital image
525 document claimed

What is claimed is:

1. A method for accessing a pre-approved image associated with a user which is stored in a first memory by an authorizing agency, the pre-approved image being assigned an identification code, and for making a ticket including the pre-approved image for authorizing a subsequent transaction, comprising:

(a) the user transferring his or her identification code for the pre-approved image to a receiving agency;

(b) the receiving agency accessing the stored pre-approved image using the transferred identification code and transferring the pre-approved image to a second memory;

(c) the receiving agency viewing the pre-approved image from the second memory so the receiving agency can verify that the viewed pre-approved image is authentic; and (d) printing a ticket for use in authorizing a subsequent transaction, the ticket at least including the authenticated pre-approved image from the second memory at the receiving agency.

2. The method of claim 1 wherein the pre-approved image is sent to the second memory via the Internet.

3. The method of claim 1 further comprising providing text or graphics associated with the pre-approved image, the text or graphics being printed on the ticket.

4. The method of claim 1 wherein the pre-approved image is delivered to the receiving agency via a courier service.

5. The method of claim 1 wherein the user provides a payment identifier specifying a credit card account to the authorizing agency and providing payment to the authorizing agency using the payment identified for the authorized transaction.

6. The method of claim 1 wherein the user provides proof of identity to the authorizing agency to be included with the pre-approved image.

7. A method for accessing a pre-approved image associated with an image of a user which is stored in a first memory by an authorizing agency, the pre-approved image being assigned a particular identification code, and for making a ticket including the pre-approved image for authorization a subsequent transaction, comprising:

(a) the user or an agent of the user transferring his or her identification code for the pre-approved image to a receiving agency;

(b) the receiving agency accessing the stored pre-approved image using the transferred identification code and transferring the pre-approved image to a remote memory location;

(c) the receiving agency viewing the pre-approved image from the remote memory location memory so the receiving agency can verify the identity of the user; and (d) printing a ticket for use in authorizing a subsequent transaction, the ticket including at least the authenticated pre-approved image from the second memory at the receiving agency.

8. The method of claim 7 wherein the pre-approved image is sent to the second memory via the Internet.

9. The method of claim 7 further comprising:

providing text or graphics associated with the pre-approved image, the text or graphics being printed on the ticket.

10. The method of claim 7 wherein the pre-approved image is delivered to the receiving agency via a courier service.

11. The method of claim 7 wherein the user provides a payment identifier specifying a credit card account to the authorizing agency and providing payment to the authorizing agency using the payment identified for the authorized transaction.

* * * * *

UNITED STATES PATENT AND TRADEMARK OFFICE
CERTIFICATE OF CORRECTION

PATENT NO. : 6,842,533 B1
DATED : January 11, 2005
INVENTOR(S) : David L. Patton et al.

It is certified that error appears in the above-identified patent and that said Letters Patent is hereby corrected as shown below:

Title page,
Item [63], Related U.S. Application Data, delete "Dec. 8, 1999" and insert -- Dec. 28, 1999 --.

Signed and Sealed this

Twenty-fourth Day of May, 2005

JON W. DUDAS
*Director of the United States Patent and Trademark Office*